Dec. 16, 1941.    A. B. CADMAN    2,265,999
FRICTION DEVICE
Filed Aug. 19, 1937    4 Sheets-Sheet 1

INVENTOR
Addi B. Cadman
By Parker, Carlson, Pitzner & Hubbard
ATTORNEYS

Dec. 16, 1941.  A. B. CADMAN  2,265,999
FRICTION DEVICE
Filed Aug. 19, 1937  4 Sheets-Sheet 2

INVENTOR
Addi B. Cadman
By Parker, Carlson, Pitzner & Hubbard
ATTORNEYS

Patented Dec. 16, 1941

2,265,999

UNITED STATES PATENT OFFICE 2,265,999

FRICTION DEVICE

Addi B. Cadman, Beloit, Wis., assignor to Warner Electric Brake Manufacturing Company, South Beloit, Ill., a corporation of Illinois Application August 19, 1937, Serial No. 159,816

12 Claims. (Cl. 188—79.5)

This invention relates generally to friction devices such as brakes and clutches, and the general object is to provide a friction device which embodies a highly efficient mechanism for transmitting an actuating force to the actuated friction element, which will operate without attention throughout the service life of the friction material used, and which will operate with substantially greater uniformity and is more readily controllable than friction devices of similar character heretofore used.

A more detailed object is to provide a friction device incorporating a novel mechanism for automatically taking up wear at the friction surfaces while at the same time insuring against the possibility of objectionable false or overadjustment due to differential expansion between the driving and driven friction elements and for minimizing any false adjustment which may occur.

A further object is to provide a novel toggle expanding mechanism in a friction device of the above character.

Still a further object is to provide a friction device having a plurality of independently movable friction elements and a novel mechanism operable automatically to take up wear on said elements differentially according to the relative amounts of wear occurring thereon.

The invention aims to provide for disabling the automatic wear adjusting mechanism when the friction surfaces become worn out.

The invention also resides in certain novel structural features of the automatic wear takeup mechanism.

Other objects and advantages of the invention will become apparent from the following detailed description taken in connection with the accompanying drawings, in which.

While the invention is shown in the drawings and will be described herein in detail as a brake especially adapted for use on automotive vehicles, it is to be understood that I do not intend to limit the invention by such disclosure but aim to cover all modifications and alternative constructions falling within the spirit and scope of the invention as expressed in the appended claims.

The brake shown is of the internal expanding type comprising a drum 12 with an inturned flange 13 bolted to the vehicle wheel or other part to be braked and a non-rotatable friction means supported for gripping engagement with the internal drum surface 14 by an anchor plate 15 which closes the open end of the drum and is carried by an axle housing 16 or other non-rotatable part of the vehicle.

In the present instance, the friction means comprises two shoes 17 of substantially semi-circular shape arranged in end-to-end relation within the drum and anchored intermediate their ends against circumferential movement but adapted for bodily radial or sliding movement into and out of gripping engagement with the drum surface. As shown, each shoe comprises a band 18 reinforced by spaced ribs 19 welded thereto and having riveted or otherwise secured to its outer surface a segment 20 of suitable friction material.

Substantially at the center of the shoes, the ribs 19 are formed with squared notches 21 into which project correspondingly shaped anchor pins 22 extending parallel to the drum axis and constituting the heads of bolts 23 which project through the anchor plate 15. Nuts 24 on the bolts are tightened against shoulders on the bolts and substantially against the plate so as to permit some degree of angular movement of the anchor pins. Leaf springs 25 fastened to the ends of the pins 22 urge the shoes axially against bosses 26 on the anchor plate.

By anchoring the shoes intermediate their ends and employing a substantially rigid truss structure, no appreciable servo or self-energizing action is developed when the shoes are expanded against the drum, the applied pressure being distributed substantially uniformly over the engaging friction surfaces so that the braking action is an invariable function of the applied expanding force. The shoes are, however, constructed to permit of some degree of relative flexing movement between their ends for a purpose to be described later. While such flexibility may be obtained in different ways, the end portions of the ribs 19 are cut away as indicated at 19' so as to render the end portions of the shoes somewhat more flexible than the central portion and thereby permit the end portions to swing about the shoe anchors.

Bodily separation of the shoes 17 to press the friction surface thereof into gripping engagement with the drum is effected by two toggle mechanisms associated with the extreme ends of the shoes and each comprising two toggle links 27 pivotally connected directly together to turn about a common axis 29 and having their remote ends pivotally connected to the ends of the respective shoes to turn about pivots 30.

To provide for adjustment of the brake for wear in a manner to be described later, each of the toggle links includes a nut or tubular member 31 positioned between the shoe ribs 19 and having laterally extending trunnions 32 seated in notches 32ª in the ribs so as to pivotally but detachably connect the links 27 and shoes. The internal bore of the member 31 is formed throughout its length with threads 33ª. Threading into the bore and having one end portion completely enclosed thereby is an externally threaded sleeve 33 the other end of which projects from the nut 31. The sleeve receives and is rotatable relative to the cylindrical end 34 of a yoke 35 having a shoulder 36 which abuts against the exposed end of the sleeve 33 and has arms which interfit with similar arms on the yoke of the other toggle link. The arms of the two yokes are directly connected by a pivot pin 37 held in place by suitable keys.

Outward radial movement of the toggle joints to straighten the toggles and thereby expand the shoes is effected in the present instance by a second pair of toggles arranged to flex in a generally circumferential direction. Each of the latter toggles comprises a link 38 pivoted at one end on the pin 37 between the yoke arms and a second link mounted to turn about the axis of the brake drum. Herein, the latter link comprises a rigid ring 39 rotatably supported by a bearing 40 on an inwardly projecting hub 41 of the anchor plate 15. In order to actuate the second toggles upon movement of the ring 39 in either direction away from a normal brake-released position (Fig. 1), each link 38 has oppositely projecting arms 42 formed with inwardly opening recesses 43 and bearing against pins 44 and 45 rigid with the ring 39 and disposed on opposite sides of and equidistant from a radius 46 of the drum axis through the pivot 29.

In the present instance, the pins 44 and 45 and pins 47 extend between and rigidly connect two narrow rings 48 and 49, the former of which is fastened as by welds 48ª to the back of the ring 39. A stud 50 rigid with the anchor plate 15 projects between and cooperates with two lugs 51 on the ring 49 to limit the extent of movement of the ring 39 for a purpose to appear later and also to avoid any possibility of either set of toggles being moved over-center. The shoes 17 are retracted from the drum, and the ring 39 and the toggle links are normally maintained in the brake-released position shown in Fig. 1 by contractile springs 52 stretched between the toggle links 38 and brackets 52ª welded to the end portions of the brake shoe ribs 19. Additional springs 53 stretched between the arms 42 and studs 54 carried by the rings 48 and 49 assist in returning the links 38 to and maintaining the same in brake-released position.

While various types of operators may be employed, the double toggle expanding mechanisms above described are particularly adapted for actuation by a power operator of the momentum type, the one shown herein being adapted to be controlled electrically by a suitable rheostat controller (not shown). For this purpose, the ring 39 is formed of magnetic material and is of U-shaped cross section enclosing an annular winding 54 and providing two concentric poles 55 the faces of which are substantially flush with the faces of segments 56 of friction material supported between the poles. Disposed opposite the magnet face and adapted for gripping engagement therewith is a flat ring 57 of magnetic material constituting the magnet armature and supported from the drum flange 13 through the medium of tangentially extending springs 57ª by which the armature is continuously maintained in light mechanical contact with the magnet face.

Figure 1:
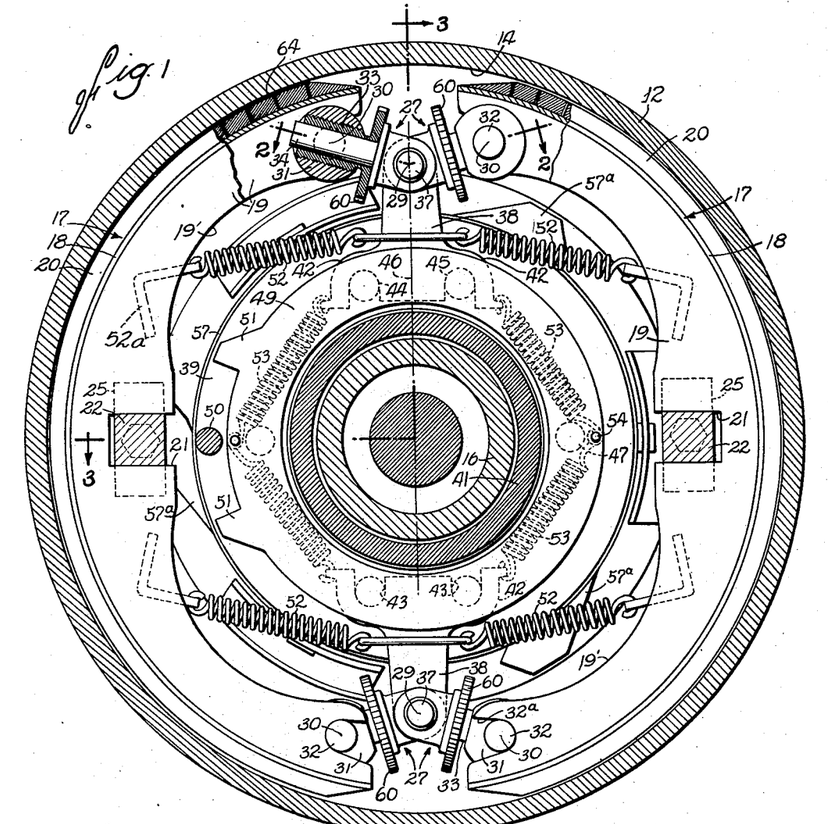
Figure 1 is a half size cross-sectional view of a friction device embodying the novel features of the present invention, the section being taken substantially along the line 1—1 of Fig. 3.
Figure 2:
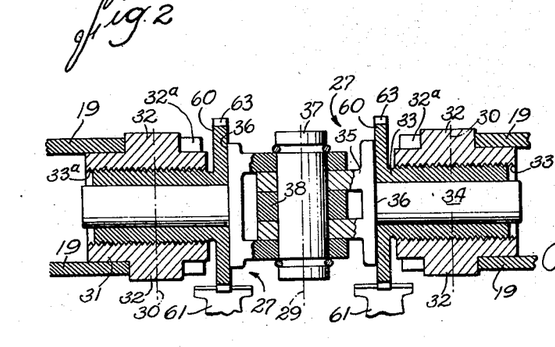
Figs. 2 and 3 are sectional views taken along the lines 2—2 and 3—3 of Fig. 1.
Figures 3, 4, 5, 6:
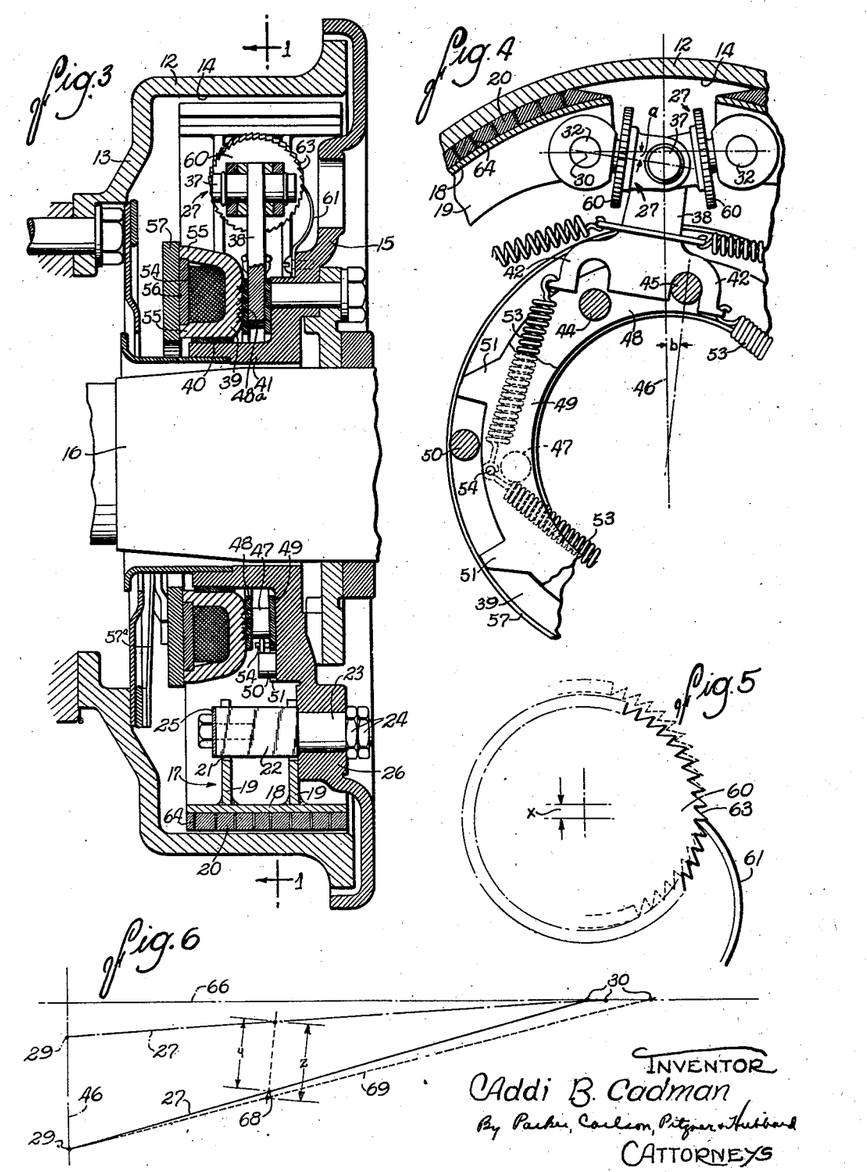
Fig. 4 is a fragmentary view similar to Fig. 1 with the parts in actuated positions.
Fig. 5 is an elevational view of one of the ratchet wheels used in the adjusting mechanism.
Fig. 6 is a view similar to Figs. 1 and 4 on a larger scale illustrating the differential action of the adjusting mechanism.

When the winding 54 is energized with the drum rotating in a counter-clockwise direction as viewed in Fig. 1, the ring 39 grips the armature and moves therewith in the same direction, the pivot pin 45 being moved toward the radius 46 and the opposite link arm 42 moving away from the pin 44. The toggles formed by the magnet ring and the links 38 are thus straightened thereby pressing the pivot pin 37 outwardly to straighten the toggle links 27 and spread the shoes into contact with the drum. The parts will then be positioned as shown in Fig. 4. Slippage then occurs between the magnet and armature rings, the braking pressure being determined by the degree of energization of the magnet and the mechanical advantage with which the toggle mechanisms operate. When the magnet is deenergized, all of the parts are restored to brake-released position by the springs 52 and 53.

The same action occurs when the magnet is energized with the drum rotating in a counter-clockwise direction. In this case, the pin 44 forms the pivot of the toggle composed of the ring 39 and the link 38.

The invention contemplates the provision of mechanism by which the brake may be adjusted automatically to compensate for wear in a manner such as to maintain a high degree of uniformity in the leverage with which the toggles operate in spite of the small effective toggle angles which are employed and other conditions which may vary widely in the service use of the friction device as a brake or as a clutch. This mechanism comprises a plurality of ratchet wheels 60 each fast on the exposed end of the sleeve 33 of one toggle link 27 and cooperating with a pawl in the form of a leaf spring 61 suitably secured as by a screw 62 to the inner side of the anchor plate 15 with its free end engaging the ratchet teeth 63 in all positions of the toggle links. The ratchet teeth are inclined so that the pawl may ride over a tooth in the outward or brake-applying movement of the links but will engage the teeth upon reverse movement of the links. In case sufficient wear has not occurred to make adjustment desirable, the pawl will ride idly along the back of the engaged ratchet tooth as the brake is applied and released, the friction in the screw threads 33ᵃ being greater than that between the pawl and ratchet wheel.

If the existing clearance between the engaging friction surfaces is sufficient to permit outward or brake-applying movement of the toggle links 27 of a magnitude indicated at $x$ (Fig. 5) and equal to the pitch of the ratchet teeth, the pawl 61 will pick up the next ratchet tooth. Then, during the inward movement of the toggle link as the brake is being released, the ratchet wheel will be turned in a direction to unscrew the sleeve 33 an amount equal to the pitch of the ratchet teeth, thereby lengthening the toggle link and correspondingly reducing the shoe clearance. By providing for lengthening of each of the four toggle links 27, the pivot 29 is maintained substantially on the radial line 46 (Fig. 1) during equal wearing off of the shoes so that the mechanical advantage at which the toggle mechanism operates is held substantially constant for a given shoe clearance.

It is of course desirable in order to avoid objectionable variations in the effective leverage of the double toggle force transmitting mechanisms to take up the wear in relatively small increments, preferably on the order of .001 of an inch on the shoe diameter. For example, where, as in the present instance, four adjusters are provided in each brake, adjustment in increments of this length may be obtained by employing No. 16 standard threads in the screws 33 and approximately fifty-two teeth on ratchet wheels 1.75 inches in diameter, the pitch of the ratchet teeth or the distance $x$ being .105 of an inch.

By virtue of the reliable character of the wear take-up mechanism, full advantage is taken of the extremely powerful action which may be obtained with the toggle actuators above described arranged to operate with small effective angles. Thus, the links 27 are made of such length and the latter is correlated with the construction of the adjusters so that in the brake-applied positions (Fig. 4) of the links, the effective angle indicated at $a$ is less than ten degrees and preferably is about four and one-half at the time when the adjusters are to become effective in reducing the shoe clearance. This angle will decrease somewhat as the shoes wear off, being approximately four degrees when the liners 20 are substantially worn away. The stops 51 are spaced to become effective before the toggles 27 have been straightened to alinement.

For a similar reason, the secondary toggle formed by the link 38 and the ring 39 is adapted to operate with a small effective angle $b$ (Fig. 4), this angle, for example, being on the order of about seven degrees.

Under severe operating conditions, vehicle brakes frequently become heated to high temperatures sometimes approximating those above which deterioration of the friction material is apt to occur. Owing to the heat insulating characteristics of the friction material ordinarily used, the drum will, during such heating, expand somewhat more rapidly than the non-rotatable parts of the brake, resulting in a corresponding increase in the clearance between the friction surfaces. To insure proper release of the brake under these conditions by preventing objectionable reduction in the shoe clearance by false or over-adjustment, the present invention contemplates a construction of the adjusting mechanisms in a manner such as to maintain a clearance under normal working conditions, that is, when the friction surfaces are substantially at normal temperatures, substantially greater than the increase in clearance which may take place as a result of the drum becoming heated to the maximum safe operating temperature of the friction material.

To the foregoing end, the ratchet teeth 63 are formed of a pitch such that the adjusters respond and become effective only to an outward movement of ratchet wheels producing a shoe expansion greater than the maximum false clearance which may develop, that is, the maximum increase in relative expansion between the drum and the shoes which may occur as a result of heating of the brake parts. For example, with parts constructed as above described, the outward movement $x$ of the ratchet wheels which must take place before the next tooth is positioned for engagement with the pawls corresponds to an increase in diameter of the brake shoes of approximately .070 of an inch. This compares with a maximum false clearance of .035 of an inch on the shoe diameter which is the approximate amount the drum diameter will increase during heating from normal temperatures to 500 degrees Fahrenheit which is the maximum temperature at which ordinary brake lining material may be heated without deterioration. Thus, a clearance of at least .035 of an inch would always be maintained between each shoe and the drum surface; consequently the possibility of over-adjustment and wide variations in the mechanical advantage of the expanding mechanisms is effectually avoided.

The invention also contemplates a construction and mounting of the non-rotatable parts of the brake in a manner such as to minimize the possible false clearance due to heating of the brake and thereby maintain a higher degree of uniformity in the mechanical advantage at which the force transmitting toggle mechanism operates. To this end, the toggle links 27 are located between the extreme ends of the shoes 17 and are connected directly together and to the shoes at fixed pivot points 29 and 30. Thus, the shoes and their connecting toggles in effect constitute a rigid metallic ring which will expand and contract in proportion to changes in its temperature. Freedom of such expansion and contraction is made possible by the type of anchorage employed which permits the shoes to float bodily and radially. It will be observed that the effective circumference of the ring formed by the non-rotatable parts is equal substantially to that of the drum so that the expansion of these parts as they become heated automatically offsets the expansion of the drum. The false clearance is thereby reduced and is an approximate function of the temperature difference between the drum and the non-rotatable braking element rather than a function of the drum temperature alone.

To effect a further reduction in the false clearance and the consequent reduction in the toggle leverage and in the loss of braking power, the invention contemplates a special construction of metallic shoes and the friction segments for the purpose of reducing the temperature lag between the heating of the shoes and the drum. This may be accomplished by forming the shoes proper of a metal which possesses substantially higher heat conductivity and coefficient of expansion than the iron or other metal of which the drum is ordinarily formed. For example, alloys containing substantial amounts of aluminum may be employed, or the drum may be composed of cast iron and the shoes of steel. Also, substantial amounts of metal in the form of threads or pins 64 may be incorporated in the friction material to increase the thermal conductivity thereof, these threads preferably extending in a radial direction and through the entire thickness of the segments so as to accelerate the conduction of heat from the friction surfaces to the metal band 20.

From the foregoing, it will be seen that through the use of the proper materials and correlation thereof with the thermal characteristics of the brake as a whole, provision may be made for expansion of the non-rotatable friction surface at a rate approaching that of the drum in spite of the fact that there is an inherent lag in the rise of the shoe temperature by the heat developed at the friction surfaces under severe operating conditions. Thus, by proper design, the false clearance in a brake of the above character may be reduced to an unobjectionable value. Actual experience has shown that under ordinary service operation on heavy duty vehicles, the expansion of the non-rotatable parts of the brake above described will closely follow that of the drum so that substantially no false clearance occurs. As a result, the braking action produced by a given applied actuating force is substantially unaffected by the temperature of the brake. Such a brake possesses optimum controllability without sacrifice of efficiency.

With a toggle mechanism having such high efficiency as those above described due to the small effective operating angles employed, it is essential, in order to maintain a substantially constant braking force for a given actuating force, that the toggle pivot 29 be disposed at all times substantially on the radial line 46. Variations in the relative rates of wear on the different shoes are conducive to shifting of the pivot off from this line owing to the tendency of the automatic adjusters to take up total wear on the two shoes. To overcome this tendency and to provide for accurate uniformity in the operation of the brake in spite of the fact that one shoe may wear more rapidly than the other, the brake is so constructed that the adjusters will operate automatically and selectively in accordance with the amounts of wear occurring on the respective shoes. That is to say, if the liner on one shoe wears more rapidly than on the other, the adjuster associated with the former shoe will operate more frequently than the other adjuster.

To the foregoing end, the shoes 17 are constructed as above described to possess sufficient rigidity to move bodily in the initial expanding movement of the toggles but have sufficient flexibility so that the ends will move relative to the central portions under normal expanding pressure and be brought into full gripping engagement with the drum surface. As previously described, such flexibility is obtained in the present instance by narrowing the ribs 19 toward the ends of the shoes as indicated at 19'.

The differential adjusting action may best be explained by reference to Figs. 7 to 11 which show various positions of the brake parts after one liner 20ª has worn down substantially more than the other liner 20ᵇ and more than .001 of an inch has worn off from the former subsequent to the previous adjustment. By the differential adjusting action, the length of the toggle link 27ª has, by previous adjustment, been lengthened substantially more than the link 27ᵇ.

Figures 7, 8, 9:
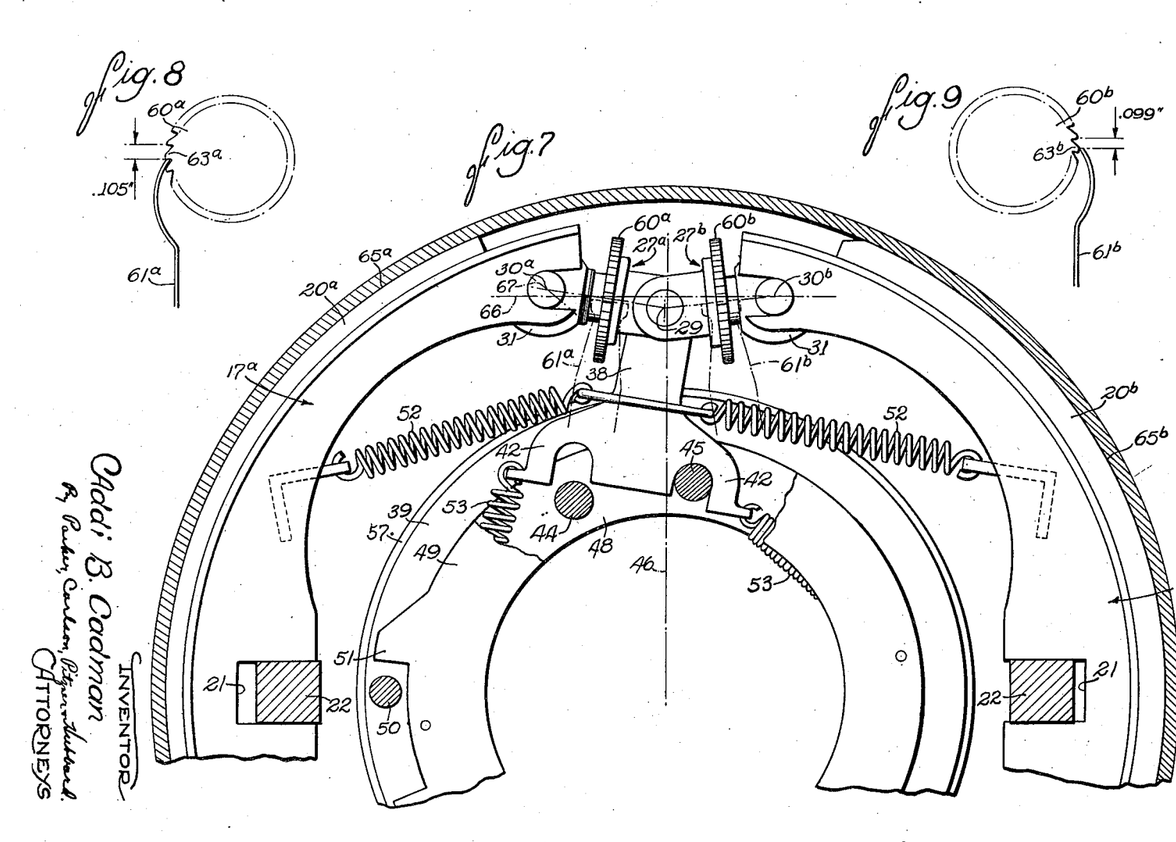
Fig. 7 is a diagrammatic view illustrating the positions of certain of the parts under different operating conditions.
Figs. 8 and 9 are fragmentary diagrammatic views of the wear adjusters in the positions occupied in Fig. 7.
Figure 10:
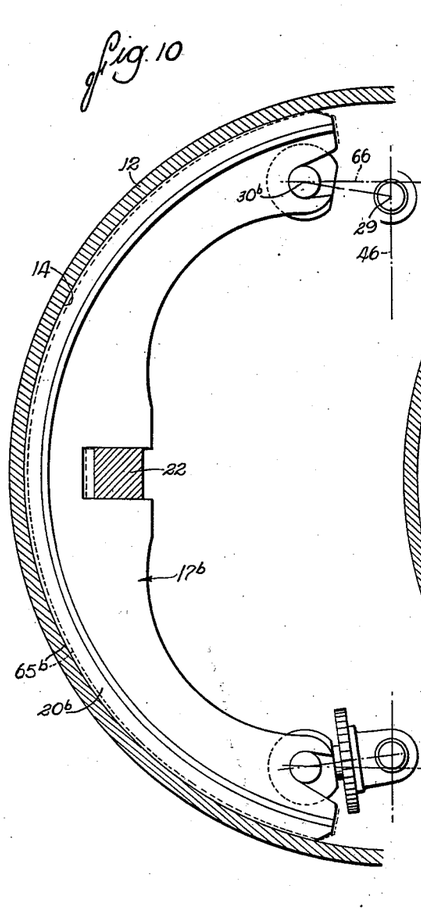
Figs. 10 and 11 are fragmentary cross-sectional views showing different positions of the brake shoes.
Figure 11:
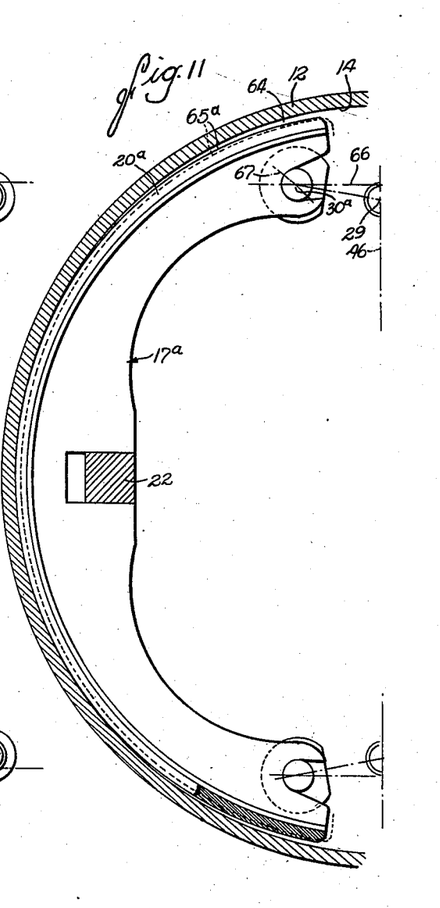

Under the conditions assumed, the surface 65ᵇ of the liner 20ᵇ will have a radius of curvature substantially equal to the drum and will, when in brake-released position, be positioned as indicated in dotted outline in Fig. 10. When the brake is applied, the surface 65ᵇ will be brought into full contact with the drum surface 14 without flexing of the shoe ends. In the case of the worn shoe 17ª, the surface 65ª, due to the semi-flexible character of the shoe, will have worn down to a smaller radius of curvature. In the released position of the brake, the surface will occupy the position shown in dotted outline in Fig. 11. As the shoes are being expanded and at the time when the central portion of the liner 20ª contacts the drum as shown in full lines in Fig. 11, the end portions of the friction surface 65ª will, due to the smaller radius of curvature of this surface, be spaced from the drum surface as indicated at 64. At this time, both of the toggle pivots 30ª and 30ᵇ will be disposed on the chord 66 along which they move initially due to the rigidity of the shoes. Since the end portions of the shoes possess sufficient flexibility to move relative to each other under the expanding force of the toggles, these ends will, in the continued movement of the toggle pivots 30, swing about the shoe anchor and move outwardly until the end portions of the liner surface 65ª also contact the drum surface as shown in Fig. 7. During such flexing of the ends of the worn shoe which occurs in the continued outward movement of the toggle joint 29 after the shoe 17ᵇ has engaged the drum throughout its length, the joint 29 may shift slightly off from the line 46, and the pivot 30ª will move outwardly away from the chord 66 along an arcuate path 67 having its center of curvature at the shoe anchor. As an incident to this outward shift of the pivots, the ratchet wheel 60ª will be moved farther than the ratchet 60ᵇ. Therefore, if sufficient wear has occurred on the shoe 17ª to necessitate adjustment, the pawl 61ª will, in the actuated position of the parts, pick up the next tooth of the ratchet 60ª as shown in Fig. 8 while the other pawl 61ᵇ remains ineffective as shown in Fig. 9 even though the difference in the movements of the ratchets is only a few thousandths of an inch. As a result, only the link 27ª connected to the worn shoe will be lengthened during restoration of the parts to brake-released position.

From the foregoing, it will be seen that the adjusters on the different toggle links operate selectively and take up wear only on the particular shoe which has worn down sufficiently (.001 of an inch in the present instance) to necessitate adjustment. Accordingly, the relative lengths of the links 27ª and 27ᵇ will always be such that the joint 29 will be disposed substantially on the radial line 46, the mechanical advantage of the toggle mechanism being thereby maintained constant in spite of different rates of wear occurring on the shoes.

In addition to its function of eliminating any possibility of the toggle joint moving over-center, the stops 50 operate in the present construction when the liners are worn out to render the adjusters ineffectual and thereby reduce the effectiveness of the brake so as to prevent damage to the parts which would otherwise occur due to continued operation of the adjusters. That is to say, the arrangement is such that when either or both the links 27 become lengthened due to the action of the adjusters, the lugs 51 will move progressively closer to the stop 50 during application of the brake, the lugs being fully returned to normal brake-released position (Fig. 1) each time the magnet is deenergized. The adjusters are thus rendered inoperative when the stop is finally engaged, and thereafter, the maximum braking effect capable of being obtained is reduced progressively during further wear of the liners thereby indicating to the vehicle operator the need for renewing the liners.

The action above described will be explained with reference to Fig. 6 which shows the positions of certain of the toggle parts under various conditions. The full and dot-dash lines indicate the positions of one link 27 in the brake-released and brake-applied positions respectively when the shoe liner 20 is new. After the shoe has worn away .001 of an inch, a point 68 on the link determined by the position of the ratchet wheel 60 will, during actuation of the brake, move through a distance indicated at $y$ and this will be sufficient to enable the pawl 61 to pick up the next ratchet tooth which results in actuation of the adjuster as above described. As the link 27 is lengthened by successive operations of the adjuster, the pivot 30 will assume successive positions outwardly along the chord 66 in the released position of the brake. Accordingly, the point 68 will be moved inwardly corresponding distances so that progressively greater outward movements of the link will be required in order to render the adjuster operative. To produce these movements, correspondingly increased angular movements of the actuator or magnet ring 39 are required so that in the actuated position of the parts, the lugs 51 will move closer and closer to the stop 50 as the toggle links are lengthened before actuation of the adjusters takes place. Finally, when the toggle links have been lengthened sufficiently to assume the position indicated by the dotted line 69, the ratchet wheel will move through the distance $z$ during actuation of the brake, this distance corresponding to the maximum range of movement of the magnet ring 39 which is permitted by the stop 50. Under these conditions, the adjuster is disabled against further actuation since the stop 50 prevents sufficient movement of the magnet ring and the toggle links to cause the next ratchet tooth to be picked up by the pawl 61. Following such disabling of the adjusters, the maximum braking force capable of being developed will decrease progressively in the subsequent applications of the brake, and, if such use is prolonged, the brake as a whole will become ineffectual. Such decrease serves to indicate the worn-out condition of the brake to the vehicle operator. Obviously, the parts may be constructed to cause disabling of the adjusters after any amount of wear of the liners has occurred.

In the automatic wear adjusters above described, it will be observed that there is a complete encasement of the coacting surfaces between which there is relative movement during the adjusting action. Thus, the trailing portions of the threads on the sleeve 33 are entirely enclosed by the nut 31 so that when the sleeve is turned to increase the length of the toggle link, part of the screw thread may be turned out of the nut but no part of the thread is turned from an exposed position into the nut. This arrangement effectually prevents foreign matter from accumulating between the coacting threads and impairing the sensitivity of the adjusting mechanism. By constructing the parts of material not subject to corrosion under conditions encountered in service use, the adjusters will operate reliably throughout the life of the friction lining.

The construction above described possesses all of the attributes which are desirable in a heavy duty type of friction device such as a vehicle brake. The parts are of such a simple and inexpensive construction and there is such duplication that the brake as a whole may be manufactured at low cost. In view of the substantially rigid character of the shoes, the gripping pressure is substantially equalized over the entire engaging surfaces resulting in uniformity of wear on the friction surfaces and avoiding the development of any substantial wrapping action. The brake operates with extremely uniform efficiency under all operating conditions due to the uniform pressure distribution and the provision for the maintenance of the substantially uniform shoe clearance. Finally, the brake operates consistently and is controllable with great accuracy under all loads or other variable conditions which are apt to be encountered in service use.

This application is a continuation in part of my copending application Serial No. 90,052, filed July 11, 1936.

I claim as my invention:

1. A friction device having, in combination, a drum, a friction element extending around the internal surface of said drum and having adjacent separable rods, connected toggle links pivoted at their remote ends on the ends of said elements, an operating member mounted to turn about the axis of said drum and normally maintained in released position, two pivots positioned on said member on opposite sides of a radius through the joint between said links, and a link pivotally connected at one end to said joint and having bearing engagement at the other end with said pivots when said member is in released position, said last mentioned link moving away from one of said pivots and turning about the other pivot upon movement of said member in either direction away from said released position.

2. A friction device comprising, in combination, a rotatable drum, a plurality of segmental shoes arranged in end-to-end relation around the internal surface of said drum and anchored intermediate their ends against circumferential movement but adapted for bodily radial expansion against said surface, a plurality of toggle mechanisms each connecting the adjacent ends of said shoes and adapted to be straightened by outward radial movement of the connected ends of their elements, a common operating member mounted within said drum to turn about the axis thereof, and links each pivotally connecting said member and the joint of each toggle mechanism and cooperating with the member to constitute second toggles for actuating the first toggle mechanisms and expanding said shoes against said surface upon movement of the member in one direction, the pivots between said links and said member being offset circumferentially from radii through the joints of the respective toggle mechanisms and movable radially toward such radii during actuation of the brake.

3. A friction device having, in combination, a drum, a friction element extending around the internal surface of said drum and having adjacent separable ends, a pair of toggle links pivotally connected together and to said ends, one of said links comprising an internally threaded tubular member, a cylindrical member within said tubular member, an externally threaded sleeve threaded into said tubular member and rotatable on said cylindrical member and abutting against a shoulder on the latter member, one of said members being pivotally connected to the other toggle link, and the other member being pivotally connected to one of said ends, operating means for flexing said links to expand and contract said element, a ratchet wheel fast on said sleeve, and a stationary pawl engaging the teeth of said ratchet wheel and operating in the expanding and releasing movements of said links to turn said sleeve and thereby unscrew said sleeve from said tubular member whereby to lengthen the toggle link and maintain a substantially uniform clearance between said element and said drum surface.

4. A friction device having, in combination, a drum, a friction element extending around the internal surface of said drum and having adjacent separable ends, a pair of toggle links each comprising a nut pivoted on one of said ends and a member having an external thread on one end portion completely encased by said nut whereby no part of the thread adjacent said end portion will be moved from unexposed to exposed position relative to said nut as the member is unscrewed therefrom, means pivotally connecting the adjacent ends of said members, operating means for flexing said links to expand and contract said element, and pawl and ratchet mechanism operating in response to actuating movements of predetermined magnitude of said link to unscrew said members and reduce the clearance between said element and said drum surface.

5. A friction device having, in combination, a drum, a plurality of substantially rigid segmental metal shoes arranged in end-to-end relation within said drum and carrying friction surfaces engageable with said drum, means anchoring said shoes against circumferential movement while permitting freedom of bodily radial movement of the shoes, a plurality of toggles each comprising a pair of links pivotally connected at their adjacent ends with their remote ends pivotally connected to the extreme adjacent ends of said shoes whereby said shoes and said toggles form a closed ring adapted to expand and contract as a unit in response to temperature changes, operating means connected to the toggle joints, and means operating as an incident to expansion and contraction of said shoes to lengthen each of said links and take up wear on said friction surfaces whereby to maintain a substantially uniform clearance between the shoes and drum when the friction device is released, the expansion of said ring under frictional heat compensating for expansion of said drum whereby to prevent overadjustment for wear.

6. A friction device having, in combination, a drum, a plurality of metallic shoes arranged end-to-end around the interior of said drum and carrying friction elements engageable with said drum, toggle links arranged in a plurality of pairs each having adjacent ends connected at a common pivot and remote ends pivotally joined to the extreme adjacent ends of different shoes, mechanism for actuating said toggles simultaneously to expand said elements against said drum, and individual wear take up adjusters for the respective links operable in response to expansion and contraction of said shoes to reduce the clearance between said elements and said drum in predetermined small increments, said shoes and links being connected to form a continuous metallic ring having an effective diameter substantially equal to that of said drum so as to expand with the drum and thereby minimize the false adjustment of links under frictional heat.

7. A friction device having, in combination, a drum, a plurality of friction elements engageable therewith, actuating means for pressing said elements into gripping engagement with said drum including toggle links with adjacent ends connected at a common pivot and remote ends joined to the respective elements, and adjusters selectively operable in response to predetermined increments of movement of the elements into and out of engagement with the drum for lengthening the associated links differentially in accordance with the amounts of wear occurring on the respective elements.

8. A friction device having, in combination, a drum, a plurality of friction elements engageable therewith, actuating means for pressing said elements into gripping engagement with said drum including toggle links with adjacent ends connected at a common pivot and remote ends joined to the respective elements, and adjusters selectively operable in response to movement of the elements into and out of engagement with the drum for lengthening the associated links differentially so as to maintain said pivot on a fixed radial line when said elements wear off at different rates.

9. A friction device having, in combination, a drum, a plurality of metallic shoes arranged end-to-end around the interior of said drum, anchors intermediate the ends of said shoes for holding the same against circumferential movement while permitting of bodily radial movement, toggle links arranged in a plurality of pairs each having adjacent ends connected at common pivot and remote ends pivotally joined to the extreme ends of different ends of different shoes, mechanism for actuating said toggles simultaneously to apply an expanding pressure to said shoes and press the same against said drum, the end portions of each shoe being swingable about the shoe anchor under said expanding pressure through distances corresponding to the amount of wear which has occurred on the shoe, and individual adjusters for said links operable in response to predetermined increments of expansion and contraction of said shoe ends to reduce the clearance between the respective shoe ends and said drum in predetermined increments.

10. A friction device having, in combination, a drum, a plurality of shoes arranged end-to-end around the interior of said drum and anchored against circumferential movement but being free for bodily radial movement, toggle links arranged in a plurality of pairs each having adjacent ends connected together against relative movement and remote ends joined to different shoes at pivots near the adjacent ends thereof, mechanism for actuating said toggles simultaneously to spread said pivots apart along a chord of said drum, said shoes possessing sufficient rigidity to move bodily under the initial expanding force and then to flex and permit movement of said pivots outwardly from said chord different distances determined by the relative amounts of wear on the different shoes, and individual adjusters operable in response to predetermined equal increments of outward and inward movement of the respective links to lengthen the same selectively.

11. A friction device comprising, in combination, a rotatable drum, a plurality of segmental shoes arranged in end-to-end relation around the internal surface of said drum and anchored intermediate their ends against circumferential movement but adapted for expansion against said surface, a plurality of toggle mechanisms each connecting the adjacent ends of said shoes, a common operating member mounted within said drum to turn about the axis thereof, means connecting said member and the joint of each toggle mechanism for pressing the latter outwardly to expand said shoes against the drum upon movement of the member away from released position, individual wear adjusters for increasing the lengths of the respective links, automatic actuators for said adjusters responsive to actuating movements of said links which increase progressively with the wearing off of said shoes, and means associated with said member for limiting the extent of active movement of said links whereby to disable said adjusters after said shoes have worn down a permissible amount.

12. A friction mechanism having, in combination, a rotatable drum, an expansible friction member within the drum presenting a friction surface coacting with a friction surface on said drum, a device operable upon movement in one direction to expand said member and cause gripping engagement of said surfaces, said surfaces being disengaged upon movement of said device in the opposite direction, adjusting mechanism adapted when actuated to reduce the clearance between said surfaces in small increments and actuated automatically as an incident to actuation and release of said expanding device to reduce the brake-released clearance between said friction surfaces when the prevailing brake-released clearance exceeds a predetermined value which is greater than the increment of maximum clearance increase that will occur as a result of thermal expansion of said drum in normal service operation plus one of said increments, whereby to prevent the clearance between said surfaces from being reduced to an objectionable degree by false adjustment.

ADDI B. CADMAN.